3,008,486
DIRECTIONAL VALVE FOR AUTOMATIC WATER
SOFTENERS OR CONDITIONERS
Robert E. Schulze, Deerfield, and Edmund J. Heartstedt, Glenview, Ill., and Robert J. Jauch and Christian W. Kruckeberg, Fort Wayne, Ind., assignors to Culligan, Inc., Northbrook, Ill., a corporation of Delaware
Filed Dec. 17, 1956, Ser. No. 628,585
12 Claims. (Cl. 137—599.1)

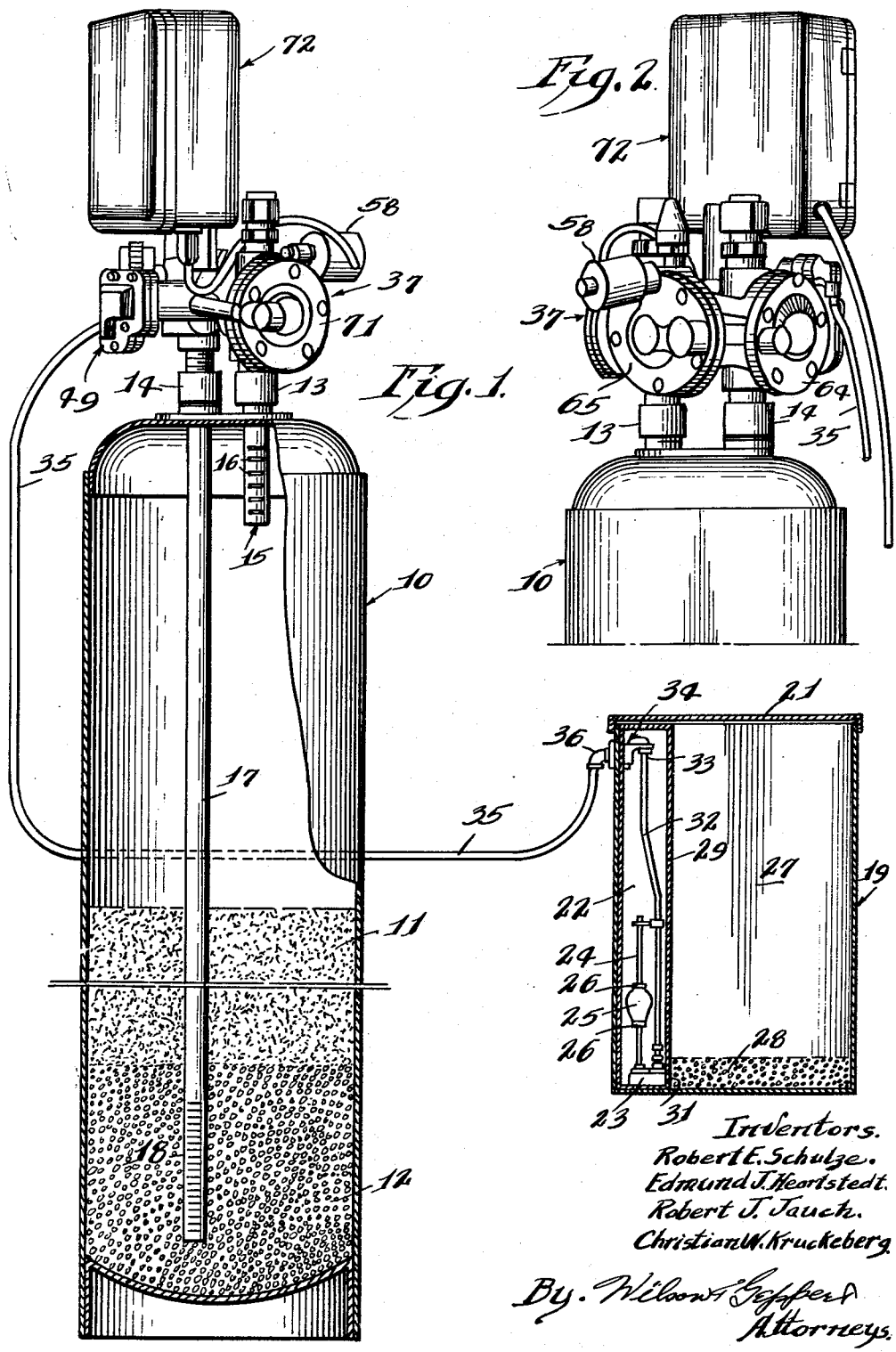

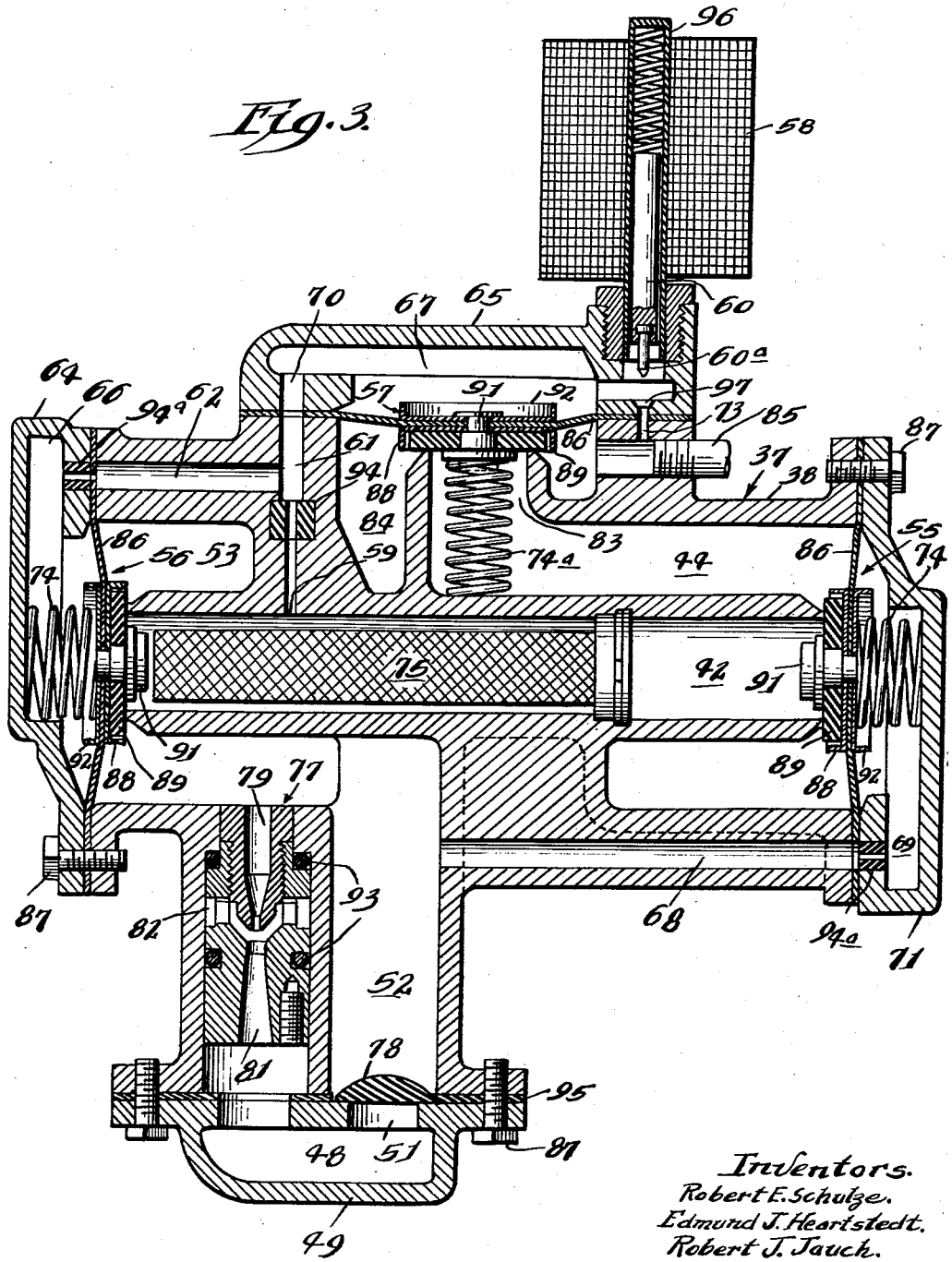

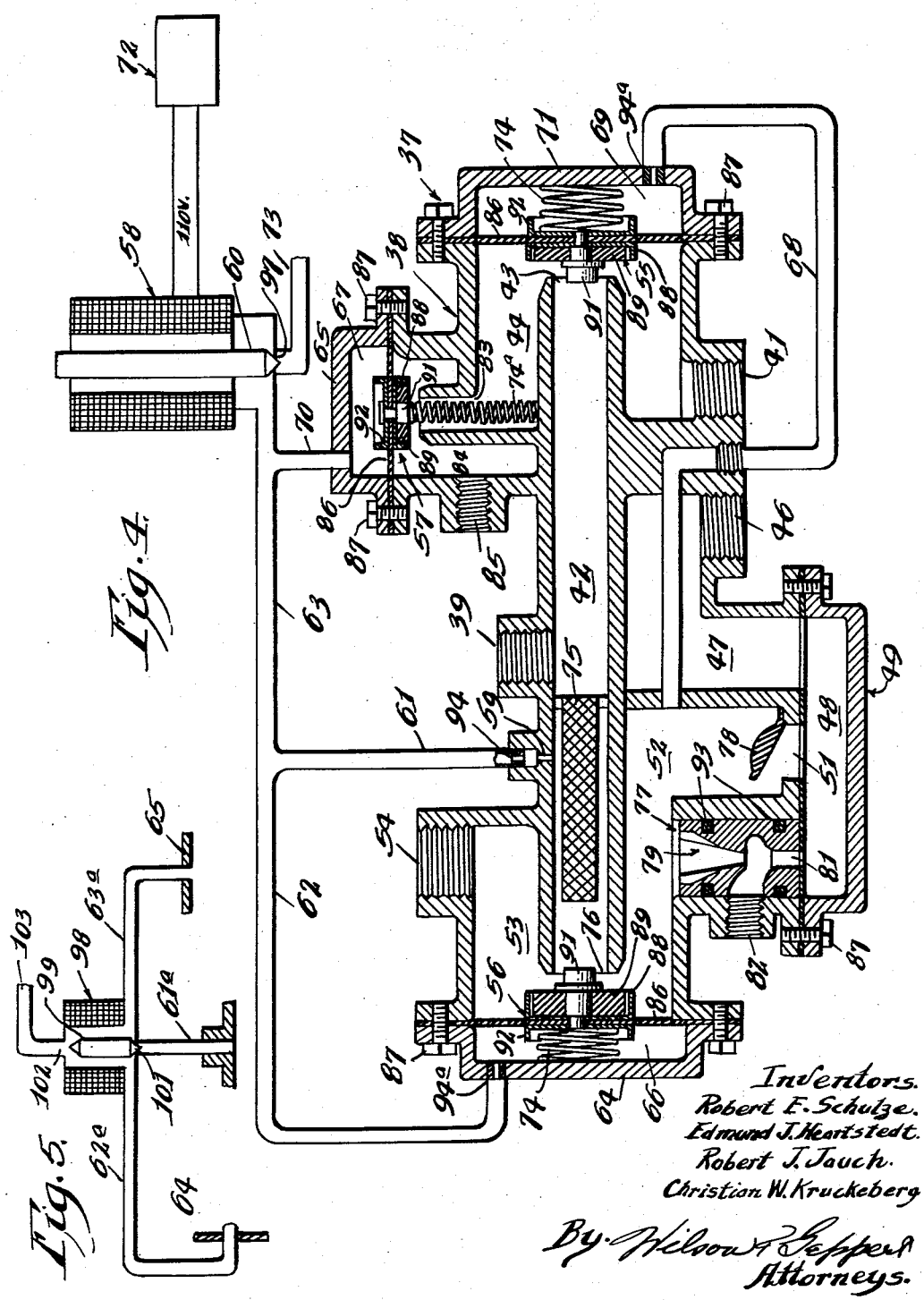

The present invention relates to a novel directional valve and operating mechanism for controlling the operation of water conditioning equipment and filters and more particularly for the automatic regeneration or rejuvenation and cleansing of the bed of minerals or materials for conditioning or filtering the water without requiring attention by the home owner or an operator.

In the preferred operation of the novel valve assembly for controlling the operation of a water softener in the home, flow of the untreated water to be softened or conditioned is directed through the valve, through the bed of treating or ion exchange materials, after which the treated water flows out of the water softener and again through the valve to the service line in the home for use. Regeneration of the bed of minerals or treating materials is initiated at suitable time intervals by a time clock, whereupon the valve mechanism is shifted hydraulically so that the untreated water is directed through a by-pass to the house service line to supply the home with water while regeneration is being effected, and such untreated water is also directed through an eductor for drawing brine from a brine tank, the valve assembly then directing this brine to the normal outlet of the water softener in a direction of flow that is the reverse from that during normal service operation. The brine entering the water softener is directed through the bed of minerals and out the normal inlet of the water softener, through the valve assembly and then to waste.

The hydraulic shifting of the valve mechanism is caused by a differential in pressure resulting from the opening of a pilot solenoid valve. At the conclusion of the brining period, an accessory brine valve as described in the copending application of Robert E. Schulze, Serial No. 552,845, filed December 13, 1955, now Patent No. 2,863,559, closes and stops the brine flow and the bed of minerals is rinsed with water that flows through the eductor and follows the same path of flow as the brine solution did through the tank and bed of minerals and out of the water softener or conditioner to waste.

At the end of this rinse period, the time clock or timer then causes the pilot solenoid to close and the valve mechanism then shifts to again direct untreated water to the softener or conditioner tank and the treated or softened water to the service line in the home.

It is, therefore, an important object of the present invention to provide a novel automatic valve construction for home water softeners or conditioners employing brine tanks as the source of the regenerant and where the valve mechanism is actuated by a timer, such valve mechanism being hydraulically operated.

Another important object of the present invention is to provide a novel valve assembly having a by-pass that functions automatically during regeneration whereby the water flow is uninterrupted during the period of regeneration.

A further object of the present invention is to provide a novel valve assembly having multiple diaphragm valves that are hydraulically-actuated to assure positive closure of these valves. One of the major problems with automatic valves is that their closure has not been sufficiently positive to prevent leakage of untreated water into the treated water in the service lines and thereby reducing the quality of the treated water.

Another important object of the present invention is to provide a valve mechanism devoid of close fitting parts, sleeves or bearings subject to wear or capable of being filled with deposits occurring in water supplies. Since water softeners or conditioners are normally employed where the water requires special treatment, it will be evident that some of the minerals, turbidity or organic matter in such untreated water supply can easily cause clogging or improper functioning of any close-fitting parts.

The present invention further comprehends the use of a solenoid valve in such manner that such valve does not handle any of the waste rinse water or brine, but merely relieves the pressure from the rear of the diaphragm valves. It is common knowledge in the water conditioning industry that corrosion occurs where there are dissimilar metals and wherever materials used are not corrosion resistant. Salt brine solutions employed in regeneration aggravate this corrosion situation. Also it is a known fact that the magnetic properties required for operation of a solenoid valve necessitate the use of metals that are not highly corrosion resistant so that it is important to keep salt brine solutions from contacting valves of the solenoid type. This problem is effectively solved in the present novel valve assembly.

While the present invention discloses the use of a solenoid valve as a pilot valve to control the flow to drain, it also comprehends the use of a 3-way solenoid valve capable of completely shutting off the pilot water so that none need be wasted. Furthermore, the pilot solenoid valve is preferably embodied in one of the diaphragm valve covers.

Another important feature of the present invention is that it employs internal ports in the valve assembly for relieving the pressure operating the diaphragms and thereby substantially reduces the cost over valves that require the use of external release tubing or conduits.

A further object of the present invention is the provision of a low maintenance valve construction through the employment of a short stroke diaphragm action, the provision of large and vertically arranged ports that prevent the accumulation of solid matter, the use of corrosion resistant materials and of interchangeable parts.

The present invention further comprehends a novel valve assembly capable of effectively operating over a broad range of water pressures. For example, the diaphragm action of the disclosed assembly will function at pressures as low as 2 p.s.i. and as high as 200 p.s.i. A pressure-sensitive flow restrictor in the pilot solenoid line controls the pilot water over the entire pressure range.

Another novel feature of the present invention is the provision of a novel removable eductor nozzle capable of being replaced or interchanged in the eductor housing by another in a different pressure range and thereby assure most efficient operation with different pressure ranges of water. To filter or strain the water required at the eductor, the present invention comprehends the provision in the valve body of a strainer of large area through which water entering the eductor is directed.

Another object of the present invention is the provision of a valve which will shift from normal service position to regeneration position even though a substantial draw is being made in the service or house lines.

A further feature of the present valve assembly is that high pressures accidentally developed in house lines may be readily relieved back through the valve to the untreated water supply lines.

A still further feature is the provision of an inlet diaphragm that functions with a slow action in closing and thereby prevents a reactance water hammer.

Another novel feature of the present invention is the provision of a check valve formed as part of the flange gasket of the eductor housing.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a perspective view with parts broken away or in vertical cross section, through an automatic water conditioning system in which is embodied the present novel directional valve assembly for the automatic operation of the service and regeneration cycles.

FIG. 2 is another perspective view of the valve assembly and the upper end of a water conditioning tank, the tank and valve assembly having been rotated through substantially 180° from the position shown in FIG. 1.

FIG. 3 is an enlarged view in horizontal cross section taken approximately in a medial plane of the valve assembly.

FIG. 4 is a schematic view of the valve assembly of FIG. 3 but with all the openings or passages and diaphragms of the valve assembly arranged in a single plane for ease in disclosing and describing its operation and the path of water flow.

FIG. 5 is a fragmentary schematic view of an alternate arrangement of the pilot tubing and embodying a 3-way solenoid for completely eliminating waste of water from this pilot tubing when the valve assembly is in position for regeneration.

Referring more particularly to the disclosure in the drawings in which there is shown an illustrative embodiment of the present invention in directional valves for automatic water conditioning equipment, the tank 10 is shown as containing a relatively deep bed of minerals 11 extending to the desired depth and beneath this bed in the bottom of the tank there is provided a gravel or filter bed 12.

The minerals of the bed 11 may be ion exchange materials of the resinous exchange or siliceous type which during water softening, conditioning or ion exchange operations tend to become inactivated by ion exchange resulting in a reduction in the quality of the discharge or effluent. When the quality of the effluent reaches a point where it is no longer suitable for the purpose intended, the minerals have reached the point of exhaustion and require reactivation or regeneration.

The tank 10 may be of the type disclosed in Culligan Patent No. 2,252,065, of August 12, 1941, and provided with suitable coupling members or fittings 13 and 14 of the type disclosed in Culligan Patent No. 2,265,268, of December 9, 1941, whereby the tank may be quickly installed, removed or replaced, when necessary. The coupling member or fitting 13 is provided with an inlet tube or manifold 15 depending into the tank 10 above the mineral bed 11 and having relatively wide slots at 16 through which the untreated water enters the tank for treatment. The coupling member or fitting 14 is provided with an outlet tube or manifold 17 depending into the tank and projecting downwardly through the bed of minerals 11 and into the gravel or filter bed 12, the lower end of the outlet tube or manifold 17 being provided with a finely slotted strainer section 18 to permit the passage of the treated water but to filter out the particles of gravel or minerals in the bed.

In automatic water softening or conditioning equipment of the type disclosed, it is contemplated that the minerals be automatically rejuvenated or regenerated at frequent intervals, such as at a predetermined period of the day or night when soft, treated or conditioned water is generally not required in the home. Consequently, the present invention provides for time control mechanism which automatically initiates the steps of backwashing, brining and rinsing of the materials requiring regeneration, and automatically returning the system to service operation.

For accomplishing regeneration, the present water softening or conditioning system discloses a brine tank 19 provided with a removable cover 21 for ready access to the interior of the tank. This interior is preferably divided to provide a float chamber 22 having a float valve in the valve housing 23 in the base of the float chamber, the float valve being carried by the lower end of a float rod 24 carrying intermediate its length a vertically movable float 25 for controlling the float valve. Rubber positioners 26 on the float rod 24 at the opposite ends of the movable float 25 are adjustable to vary the quantity of brine for regeneration by controlling the quantity of water delivered to the brine tank for dissolving salt placed in the chamber 27 of the brine tank above a bed of gravel 28 through which the brine is filtered.

The wall 29 dividing the salt chamber 27 from the float chamber 22 is provided with an opening 31 at its lower end forming a passage between said chambers, with the chamber 27 being of substantial capacity for receiving and storing a large quantity of dry, bulk salt and sterilizing agent to supply the regenerant or brine needs for a substantial period of time.

A conduit 32 in the float chamber 22 is connected at its lower end to the valve housing 23 and at its upper end is coupled at 33 to an air check valve assembly 34 in the brine line adjacent the upper end of the float chamber 22 to prevent air from being drawn into the softener tank 10 after the brine ceases to flow during regeneration. A brine tube 35 is coupled at one end at 36 to the check valve assembly. The above disclosure, including the details of the float valve in the float housing 23 and the check valve assembly 34, may be similar to that disclosed in the copending application of Robert E. Schulze, Serial No. 552,845, filed December 13, 1955, now Patent No. 2,863,559.

The present invention is directed more particularly to the directional valve assembly 37 positioned above the tank 10 for controlling the flow of water to and from the tank during normal or service operation, and the water and brine to and from the tank during regeneration of the bed of minerals at predetermined time periods. While FIG. 3 shows the diaphragm valves all closed and the schematic showing in FIG. 4 discloses these valves all open, these views are not intended to show the position of these valves during either service or regeneration, but the functioning and positioning thereof during operation will be hereinafter fully explained.

The directional valve assembly 37 comprises a valve housing 38 having a valve inlet port 39 (FIG. 4) for untreated water and a valve outlet port 41 for the untreated water, with the entering untreated water flowing into a chamber 42. During normal or service operation the untreated water is directed through a then open inlet valve port 43 into an annular chamber 44 and through the outlet port 41 connected through the inlet coupling 13 to the inlet tube or manifold 15 of the water softening or conditioning tank 10.

The untreated water passes downwardly through the bed of minerals or conditioning material, then upwardly through the outlet tube or manifold 17 of the tank, through a valve inlet port 46 communicating with a passageway 47 in the valve housing 38 and connected passage 48 in a valve eductor cover plate 49. From the passage 48, the main flow of treated or conditioned water flows through a then open port 51 into a chamber 52 and then into a communicating annular chamber 53 leading to a valve outlet port 54 of the valve assembly which is connected to the service line in the home.

When the valve assembly is in the service position, a diaphragm valve 55 is open, a diaphragm valve 56 is closed as is also a diaphragm valve 57 and a pilot solenoid valve 58. This pilot solenoid valve 58 is closed and water from the chamber 42 is adapted to pass through an orifice 59 into conduit 61 which through branch conduits 62, 63 and 70 communicate with the diaphragm valves 56 and 57 through passages in their respective covers 64 and 65. Line pressure which develops in chamber 66 in the cover 64 behind the diaphragm valve 56 and chamber 67 in the cover 65 behind the diaphragm valve 57 holds these valves 56 and 57 closed.

During such normal or service operation, when a draw is placed on the plumbing system of the home, the pressure on the outlet side of the valve assembly is reduced all the way back to the passageway or chamber 52. A conduit 68 communicating with the passageway 52 and a chamber 69 in the cover 71 for the diaphragm valve 55 reduces the pressure in the chamber 69. With line pressure in the annular chamber 44 and reduced pressure in the chamber 69, the diaphragm valve 55 opens to permit untreated water to flow to the water softener or conditioner.

The present assembly includes a conventional automatic timer within a housing 72 for initiating the regeneration cycle on a predetermined timing period. When the time period arrives for which the automatic timer is set, the pilot solenoid valve 58 opens to permit water to drain from the pilot line or tubing 61 and branch conduits 62, 63 and 70, through a conduit or vent line 73 to waste. With the pilot line 61 and branch pilot lines 62, 63 and 70 now open to drain, both diaphragm chambers 66 and 67 in the valve covers 64 and 65, respectively, are reduced to atmospheric pressure and diaphragm valves 56 and 57 open. At the same time diaphragm valve 55 is held closed both by its spring 74 and a differential in pressure between chamber 69 which is now essentially line pressure, and the annular chamber 44 which approaches atmospheric pressure. A spring 74ª spring-biases the valve 57 to open position.

With the valve assembly now in position for regeneration, untreated water continues to flow into the inlet port 39 of the valve housing and into the communicating chamber 42. However, as such entering water cannot now pass through the inlet valve port 43 due to the diaphragm valve 55 being closed, the entering untreated water passes through a strainer 75 and out through a port 76 with the diaphragm valve 56 now open. From the port 76 the entering water passes into the annular chamber 53 and such untreated water may pass out of the outlet port 54 to the service line of the home.

Water from the annular chamber 53 enters the chamber 52 which communicates with an eductor 77 and with the port 51. However, water entering the passage 52 causes a check valve 78 to close and seal off passage through the port 51 and the only access to the chamber 48 in the eductor cap or cover 49 is through the eductor 77. Water thus passes into the opening of a nozzle 79 and through the passage or throat 81 of the eductor. The vacuum created by the eductor causes brine to flow through a port 82 connected to the brine tube 35 communicating with the conduit 32 in float chamber 22 of the brine tank 19. The salt brine from the conduit 32 joins with the entering strained but untreated water in the nozzle 79 and flows into the chamber 48 of the eductor cap, into the passage 47 and out of the valve assembly through the usual valve inlet port 46 and into the tank 10, with the flow through the tank now being the reverse of that during normal or service operation.

The entering brine solution flows downwardly through the outlet tube or manifold 17 and percolates up through the minerals or ion exchange bed 11 and then passes out of the tank 10 through the usual inlet manifold 15 and into the valve outlet port 41 of the valve housing 38. In its passage through the bed of minerals this brine solution regenerates the bed and releases waste calcium, with the waste solution passing through the valve outlet port 41, into the annular chamber 44, out of this chamber through a port 83 controlled by the drain diaphragm valve 57, and into an annular chamber 84 from which the waste solution passes through a port 85 to waste drain. The brine solution continues to follow the path described above until a predetermined quantity has been delivered from the brine tank 19. This quantity may be controlled by means of the valve arrangement described in the above mentioned co-pending application of Robert E. Schulze, Serial No. 552,845, filed December 13, 1955, now Patent No. 2,863,559.

At the end of the brining period, all flow of the brine solution to the valve assembly is stopped through the port 82 but water continues to flow through the eductor nozzle 79 and throat 81 and rinses the remaining brine solution from the bed of minerals being regenerated or reactivated. This rinse water follows the same path as the brine solution through the valve assembly 37 and tank 10. At the end of the predetermined regeneration period, the timer 72 shuts off and closes the solenoid valve 58 and the brine and rinse period is concluded whereupon the drain diaphragm valve 57 closes. At the same time, the by-pass diaphragm valve 56 closes and the service diaphragm valve 55 is ready to be opened whenever there is a draw on the service line or supply to the home. Untreated water then passes through the valve assembly 37 and the tank 10 for treatment in the manner described above for service operation.

The service diaphragm valve 55, the by-pass diaphragm valve 56 and the drain diaphragm valve 57, are each provided with a flexible diaphragm 86 the periphery of which forms a gasket for the hollow or channelled caps or covers 71, 64 and 65 for these valves, with the caps or covers each secured in operative position by bolts or attaching means 87. To each diaphragm 86 is affixed a retainer ring 88 and a rubber or resilient valve member 89 by means of a rivet or the like 91. A retainer ring 92 is also secured to the rear face of the diaphragm 86 of the valves 55 and 56 to receive a compression spring 74 to guide and stabilize the motion of these diaphragm valves. These springs are relatively light and keep these diaphragms from fluttering.

The eductor assembly 77 is bodily removable when the cap or cover 49 is removed from the valve body 38. When assembled the eductor is sealed within the bore of the valve housing or casting by means of spaced O-rings 93. So that different sizes of nozzles 79 may be employed, the nozzle is threaded into and removable from the eductor housing for quick assembly, detachment and replacement. The details of the eductor assembly are more clearly disclosed in FIG. 3. This permits proper efficiency for different pressure ranges of the water flowing therethrough.

In the conduit or tubing 61 is provided a flow restrictor or flow restricting washer 94 which controls and limits the flow therethrough of waste water under control of the solenoid valve 58 and its core 60 over a wide pressure range (FIG. 4).

A flow restrictor 94ª is shown provided in the branch line 62 of the pilot line 61 where it enters the cover 64 and communicates with the diaphragm chamber 66, and a similar flow restrictor 94ª is provided in the pilot line 68 where it enters the cover 71 to communicate with the diaphragm chamber 69. The pilot line 68 supplies hydraulic fluid from the passageway 52 to one side of the diaphragm 86 of the valve 55 for closing this valve and its restrictor 94ª prevents rapid pressure changes from occurring at the opposite sides of the diaphragm thus preventing too rapid closing and thumping of the valve. The same is true of the restrictor 94ª in the branch 62 of the pilot line 61 supplying fluid pressure to the chamber 66 at one side of the diaphragm 86 of the by-pass valve 56.

As shown in FIG. 3, the check valve 78 is preferably formed as part of the flange gasket 95 for sealing the cap or cover 49.

As more clearly disclosed in FIG. 3, the core 60 of the solenoid 58 is spring-biased by a compression spring 96 to cause the reduced end 60ª of the core to close the port 97 communicating with the drain conduit or vent line 73 when deenergized during service operation, and to open this port when energized by the timer at a predetermined time period. The drain or vent line 73 is shown connected with the drain port 85.

A spring 74ª spring-biases the drain diaphragm valve 57 to open position and prevents this valve from closing due to back pressure in the chamber 67 and communicating pilot line 70 which in turn communicates with the vent line 73.

An alternate construction of the pilot solenoid valve 58 and of the pilot or vent tubing 61, 62, 63 and 70 is disclosed in FIG. 5. In this form, the conduit or tubing 61ª and branch conduits 62ª and 63ª are connected in the manner shown in FIG. 4 with the branches 62ª and 63ª connected to the caps or covers 64 and 65, but in this alternate arrangement there is employed in place of the solenoid valve 58 a 3-way solenoid valve 98 that completely eliminates waste of water through the orifice 59 from the chamber 42 when the valve assembly is in position for regeneration.

This solenoid valve 98 comprises a core 99 shown diagrammatically in FIG. 5 in an operative position in which one end of the core seats and closes passage from the tube 61ª at the port 101. In this position of the core 99, a port 102 communicating with a drain tube 103 is maintained open to drain and water from tubes 62ª and 63ª is reduced to substantially atmospheric pressure causing a reduction in pressure in the valve chambers 66 and 67 whereupon the by-pass diaphragm valve 56 and the drain diaphragm valve 57 open in the manner described with respect to the functioning of solenoid valve 58. When the timer 72 which is electrically connected to the solenoid in the same manner as solenoid 58 (FIG. 4) energizes the solenoid, the other end of the core 99 seats and closes the port 102 and passage to the drain line or tube 103. This opens the port 101 to line pressure from the tubing 61ª, whereupon the water pressure transmitted through the tubes 62ª and 63ª to the chambers 66 and 67 causes a relatively high pressure behind the diaphragm valves 56 and 57 and closes these valves.

Although FIGS. 3, 4 and 5 show electrically operated valves, solenoid valve 58 (FIGS. 3 and 4) may be replaced with a manual valve for opening and closing the port 97, and a 2-way manual valve may be substituted for the 3-way solenoid valve 98 (FIG. 5) for opening and closing the ports 101 and 102.

Having thus disclosed the invention, we claim:

1. A directional valve unit for controlling the direction and flow of liquid therethough, comprising a valve body divided into plural chambers, an inlet in said valve body leading to the first of said chambers, first and second spaced outlets, said first outlet communicating with said first chamber and said second outlet communicating with a second chamber, a service outlet communicating with said second chamber, a by-pass leading from the inlet to said second chamber, a regenerant supply port communicating with said second chamber, a drain port communicating with said first chamber, three hydraulically-actuated diaphragm valves in said valve body comprising a normally open service diaphragm valve in said first chamber for controlling entry of liquid into said first chamber from said inlet, a normally closed by-pass diaphragm valve in said second chamber for controlling flow of liquid through said by-pass to said second chamber, and a normally closed drain diaphragm valve communicating with said first chamber for controlling the flow of liquid from said first chamber to said drain port, an eductor in said second chamber, a central passage in said eductor leading from the second chamber to the second outlet and communicating with said regenerant supply port, a pilot line communicating with the liquid source and leading to a vent line, a valve controlling flow in said pilot line, and means initiated by operation of said last mentioned valve for closing the service diaphragm valve and opening said by-pass and drain diaphragm valves to reverse the flow of liquid through the valve by establishing liquid flow from said inlet through said by-pass, said second chamber and said central passage of the eductor to the second outlet.

2. A directional valve unit as set forth in claim 1, in which the means initiating movement of said diaphragm valves includes pressure conduits extending from the pilot line to the rear of the by-pass and drain diaphragm valves for hydraulically actuating said valves, said flow controlling valve being solenoid actuated.

3. A directional valve unit as set forth in claim 1, in which said pilot line communicates with said by-pass, said means initiating movement of said diaphragm valves includes pressure conduits extending from said pilot line to the rear of said by-pass and drain diaphragm valves, said pilot line and pressure conduits subjected to line pressure from said by-pass to hydraulically actuate and retain said by-pass and drain diaphragm valves in normally closed position, and a pressure sensitive flow restrictor in the pilot line controlling the liquid in the pilot line over the entire pressure range.

4. A directional valve unit as set forth in claim 1, in which the means to initiate movement of said diaphragm valves includes first and second pressure conduits extending from said pilot line to the rear of said by-pass and drain diaphragm valves which are subjected to line pressure to retain said valves normally closed, and a third pressure conduit extending between said second chamber and the rear of said service diaphragm valve so that when liquid is removed from the second chamber causing a drop in pressure in said chamber and in said third pressure conduit during normal liquid flow, the service diaphragm valve opens under line pressure exerted on its face to allow passage of liquid from the inlet to said first outlet.

5. A directional valve unit for controlling the direction and flow of liquid therethrough, comprising a valve body having plural chambers and a passage connecting said chambers, an inlet communicating with said passage, first and second spaced outlets in said valve body, said first outlet communicating with a first chamber and said second outlet communicating with a second chamber, a service outlet communicating with the second chamber, said passage having a by-pass from said inlet to the second chamber, a regenerant supply port communicating with said second chamber, a drain port communicating with said first chamber, three hydraulically-actuated diaphragm valves in said valve body comprising a service diaphragm valve in said first chamber for controlling entry of liquid into said first chamber from said passage and opening when liquid is withdrawn from said second chamber during normal flow, a normally closed by-pass diaphragm valve in said second chamber for controlling the passage of liquid through said by-pass from said inlet to said second chamber, and a normally closed drain diaphragm valve in said first chamber, pressure conduits communicating with said passage and carrying liquid to the one side of the by-pass and drain diaphragm valves not exposed to the liquid passing through said valve chambers, and a pilot valve for the pressure conduits and leading to a vent line which when opened allows liquid in said pressure conduits to pass to the vent line and relieves the liquid pressure at said one side of the by-pass and drain diaphragm valves allowing said diaphragm valves to open under liquid pressure in said valve chambers and reverse the liquid flow.

6. A directional valve unit as set forth in claim 5, in which the by-pass communicates with the service outlet in the second valve chamber to supply liquid to said outlet when the flow of liquid is reversed.

7. A directional valve unit as set forth in claim 5, in which said pilot valve is electrically actuated, a pressure conduit communicating between said second chamber and the side of the service diaphragm valve opposite to that exposed to the liquid in the first chamber, so that when the by-pass diaphragm valve is opened, liquid flows under line pressure into said second chamber and into said last mentioned pressure conduit to retain said service diaphragm valve closed.

8. A directional valve unit as set forth in claim 5, in which each of said diaphragm valves has a cover providing a pressure chamber at the rear of its diaphragm communicating with said respective pressure conduits for supplying hydraulic pressure to said pressure chambers.

9. A directional valve unit as set forth in claim 5, in which a pilot line extends from said by-pass and communicates with the pilot valve at the junction of the pressure conduits communicating with the by-pass and drain diaphragm valves and the vent line, said pilot valve being a 3-way solenoid valve so that when said valve is in a first position it closes passage to said vent line and the pilot line communicates with the pressure conduits, and when said pilot valve is in a second position the pressure conduits communicate with said vent line and the pilot line is closed.

10. A directional valve unit for controlling and directing different flows of liquid therethrough, comprising a valve body having internal valve chambers, an inlet and a first outlet communicating with one of said chambers, a second outlet spaced from said first outlet and a service outlet communicating with a second of said chambers, a by-pass communicating with said inlet and leading to the second chamber, a drain port communicating with said first chamber for discharge during reverse flow between said first and second spaced outlets, a valve mechanism in said valve body comprising three hydraulically-actuated diaphragm valves, the first diaphragm valve being located in said first chamber for controlling entry of liquid from said inlet during normal flow through said valve body, a normally closed second diaphragm valve in said second chamber for controlling flow of liquid through said by-pass to said second chamber, and a normally closed third diaphragm valve in said first chamber controlling flow of liquid from said first chamber to said drain port, pressure conduits communicating between said by-pass and said second and third diaphragm valves, a normally closed pilot valve in said pressure conduits, a third pressure conduit communicating between said second chamber and said first diaphragm valve permitting the latter valve to open when the pressure is reduced in said second chamber during normal liquid flow to said service outlet, said last mentioned pressure conduit being subjected to line pressure to retain said first diaphragm valve closed when the second diaphragm valve is opened due to opening of said pilot valve.

11. A directional valve unit as set forth in claim 10, in which each of said hydraulically-actuated diaphragm valves is located in an outer opening of said valve body, a recessed cover for each of said openings for enclosing its valve and each cover having a duct carrying hydraulic fluid from its respective pressure conduit into the recess of its cover and to the rear of its diaphragm for hydraulically closing its valve.

12. A directional valve unit as set forth in claim 10, in which a regenerant supply port in said valve body communicates with said second chamber, parallel passages between the second outlet and said second chamber, a check valve in one of said passages permitting flow only from the second outlet to the second chamber, and an eductor in the second passage with the regenerant supply port entering the eductor at a point intermediate the ends thereof.

References Cited in the file of this patent

UNITED STATES PATENTS

| | | |
|---|---|---|
| 2,504,816 | De Ville | Apr. 18, 1950 |
| 2,596,822 | Pick | May 13, 1952 |
| 2,670,328 | Webb | Feb. 23, 1954 |
| 2,717,002 | Lucien | Sept. 6, 1955 |
| 2,744,867 | Webb | May 8, 1956 |
| 2,800,143 | Keller | July 23, 1957 |
| 2,825,363 | Bird | Mar. 4, 1958 |
| 2,869,725 | Staats | Jan. 20, 1959 |
| 2,880,872 | Albertson | Apr. 7, 1959 |
| 2,906,281 | Pillotte | Sept. 29, 1959 |